US011896857B2

(12) United States Patent
Koberstein et al.

(10) Patent No.: US 11,896,857 B2
(45) Date of Patent: Feb. 13, 2024

(54) PERSONAL AIR PURIFYING RESPIRATOR

(71) Applicant: FORD GLOBAL TECHNOLOGIES, LLC, Dearborn, MI (US)

(72) Inventors: Manfred Koberstein, Troy, MI (US); Clay Wesley Maranville, Ypsilanti, MI (US); William Stewart Johnston, South Lyon, MI (US); Jennifer A. Herr-Rathke, Plymouth, MI (US); Nicholas Andrew Mazzocchi, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 436 days.

(21) Appl. No.: 17/149,467

(22) Filed: Jan. 14, 2021

(65) Prior Publication Data

US 2022/0219023 A1 Jul. 14, 2022

(51) Int. Cl.

| | |
|---|---|
| ***A62B 7/10*** | (2006.01) |
| ***A62B 7/12*** | (2006.01) |
| ***A62B 9/00*** | (2006.01) |
| ***A62B 18/00*** | (2006.01) |
| ***A62B 23/02*** | (2006.01) |

(52) U.S. Cl.

CPC .................. *A62B 7/10* (2013.01); *A62B 7/12* (2013.01); *A62B 9/00* (2013.01); *A62B 18/006* (2013.01); *A62B 23/02* (2013.01)

(58) Field of Classification Search

CPC .... A62B 7/10; A62B 7/12; A62B 9/00; A62B 18/006; A62B 23/02; A62B 17/04; A62B 18/003; A61M 16/0066–0069

See application file for complete search history.

(56) References Cited

U.S. PATENT DOCUMENTS 2,128,897 A * 9/1938 Angell .................... C10G 11/00 208/77
3,496,703 A * 2/1970 Maguire .............. A62B 18/006 55/482

(Continued)

FOREIGN PATENT DOCUMENTS

CN 111701158 A * 9/2020 ............. A62B 18/02

OTHER PUBLICATIONS

English translation for CN 111701158, machine translated by espacenet.com, translated on Apr. 18, 2023.*

*Primary Examiner* — Tu A Vo

(74) *Attorney, Agent, or Firm* — David B Kelley; Brooks Kushman P.C.

(57) ABSTRACT

A respirator includes a head unit configured to be received on a human head and a purifying unit configured to provide purified air to the head unit. The purifying unit includes a first housing portion having an interior side defining a blower cavity, an exterior side defining a partial filter chamber with a filter sealing surface, and an inlet hole circumscribed by the sealing surface and extending between the interior and exterior sides. A second housing portion has an interior side defining a blower cavity. The first and second housings are attached to each other to form a housing such that the blower cavities are opposite each other to define a blower chamber within the housing. A blower is disposed in the blower chamber. A filter covers over the inlet hole and is disposed against the sealing surface such that air entering the hole passes through the filter.

17 Claims, 8 Drawing Sheets

(56) References Cited

U.S. PATENT DOCUMENTS 4,237,877 A * 12/1980 Boehler ............... A62B 18/006
128/203.29
4,430,995 A * 2/1984 Hilton ............... A61M 16/0069
128/205.12
4,590,951 A * 5/1986 O'Connor ............ A62B 18/006
128/205.12
4,899,740 A * 2/1990 Napolitano ............. F04D 25/08
128/205.12
5,394,870 A * 3/1995 Johansson ............ A62B 18/006
128/201.25
6,497,756 B1 * 12/2002 Curado ................ A62B 18/088
55/DIG. 35
6,575,165 B1 * 6/2003 Cook ..................... A62B 9/006
128/205.27
8,069,853 B2 12/2011 Tilley
9,481,424 B2 * 11/2016 Hagen .................. A62B 18/006
11,628,318 B1 * 4/2023 Wedding .............. A62B 18/006
128/205.12
2006/0090754 A1 * 5/2006 Mittelstadt ............. A62B 23/02
128/201.17
2007/0048159 A1 * 3/2007 DiMatteo .......... A61M 16/0066
417/423.14
2007/0131228 A1 * 6/2007 Croll ................... F04D 29/4246
128/204.15
2010/0101575 A1 4/2010 Fedorko et al.
2012/0037160 A1 * 2/2012 Sung ....................... F04D 25/08
128/205.12
2012/0266873 A1 * 10/2012 Lalonde ............ A61M 16/0063
128/205.24
2015/0306324 A1 * 10/2015 Ayon ................ A61M 16/0066
128/205.25
2016/0015919 A1 * 1/2016 Librett ................ A61M 16/107
128/205.13
2016/0317685 A1 * 11/2016 Pujol ................. A61M 16/0066
2018/0028846 A1 * 2/2018 Hur ........................ A62B 17/04
2018/0110946 A1 * 4/2018 Palou Fustè .......... A61M 16/06
2019/0030377 A1 * 1/2019 Sharma .................... A62B 9/04
2019/0117820 A1 * 4/2019 Dam ......................... B03C 3/32
2019/0143154 A1 * 5/2019 Gangadhar ............ A62B 23/02
128/202.22
2019/0366025 A1 * 12/2019 Diehl ................ A61M 16/0003
2020/0297044 A1 * 9/2020 Xie .................... A41D 13/0025
2020/0297962 A1 * 9/2020 Teng ................. A61M 16/0875
2020/0346050 A1 * 11/2020 Xie ........................ A62B 23/02
2020/0353296 A1 * 11/2020 Crenshaw ............ A62B 23/025
2020/0368468 A1 * 11/2020 Liu ..................... A61M 16/109
2021/0001068 A1 * 1/2021 Davoine ........... A61M 16/0066
2021/0001069 A1 * 1/2021 Higashiyama .... A61M 16/0069
2021/0008310 A1 * 1/2021 Wada ................ A61M 16/0066
2021/0077760 A1 * 3/2021 Wada .................. A61M 16/024
2021/0178108 A1 * 6/2021 Higashiyama ...... A61M 16/147
2021/0339059 A1 * 11/2021 Frejd ................... F04D 25/0693
2021/0369996 A1 * 12/2021 Jancarik ............ A61M 16/0066

* cited by examiner

PERSONAL AIR PURIFYING RESPIRATOR

TECHNICAL FIELD

The present disclosure relates to personal air purifying respirators.

BACKGROUND

Personal air purifying respirators are used to filter contaminated air and provide clean, breathable air to a user. The respirator includes a filter configured to block pathogens, dirt, and other contaminations from entering the user's respiratory system.

SUMMARY

According to one embodiment, a respirator includes a head unit configured to be received on a human head and a purifying unit configured to provide purified air to the head unit. The purifying unit includes a first housing portion having an interior side defining a blower cavity, an exterior side defining a partial filter chamber with a filter sealing surface, and an inlet hole circumscribed by the sealing surface and extending between the interior and exterior sides. A second housing portion has an interior side defining a blower cavity. The first and second housings are attached to each other to form a housing such that the blower cavities are opposite each other to define a blower chamber within the housing. A blower is disposed in the blower chamber. A filter covers over the inlet hole and is disposed against the sealing surface such that air entering the hole must pass through the filter.

According to another embodiment, a respirator includes a head unit configured to be received on a human head and a purifying unit configured to provide purified air to the head unit. The purifying unit includes a housing formed of a pair of front and back halves that are secured together to form the housing. The housing defines a blower chamber, an electronics-and-battery chamber, a filter cavity with a sealing surface, and an inlet hole connecting the blower chamber and the filter cavity. A blower is disposed in the blower chamber, and a filter is disposed in the filter cavity. The filter covers the inlet hole and is disposed against the sealing surface.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
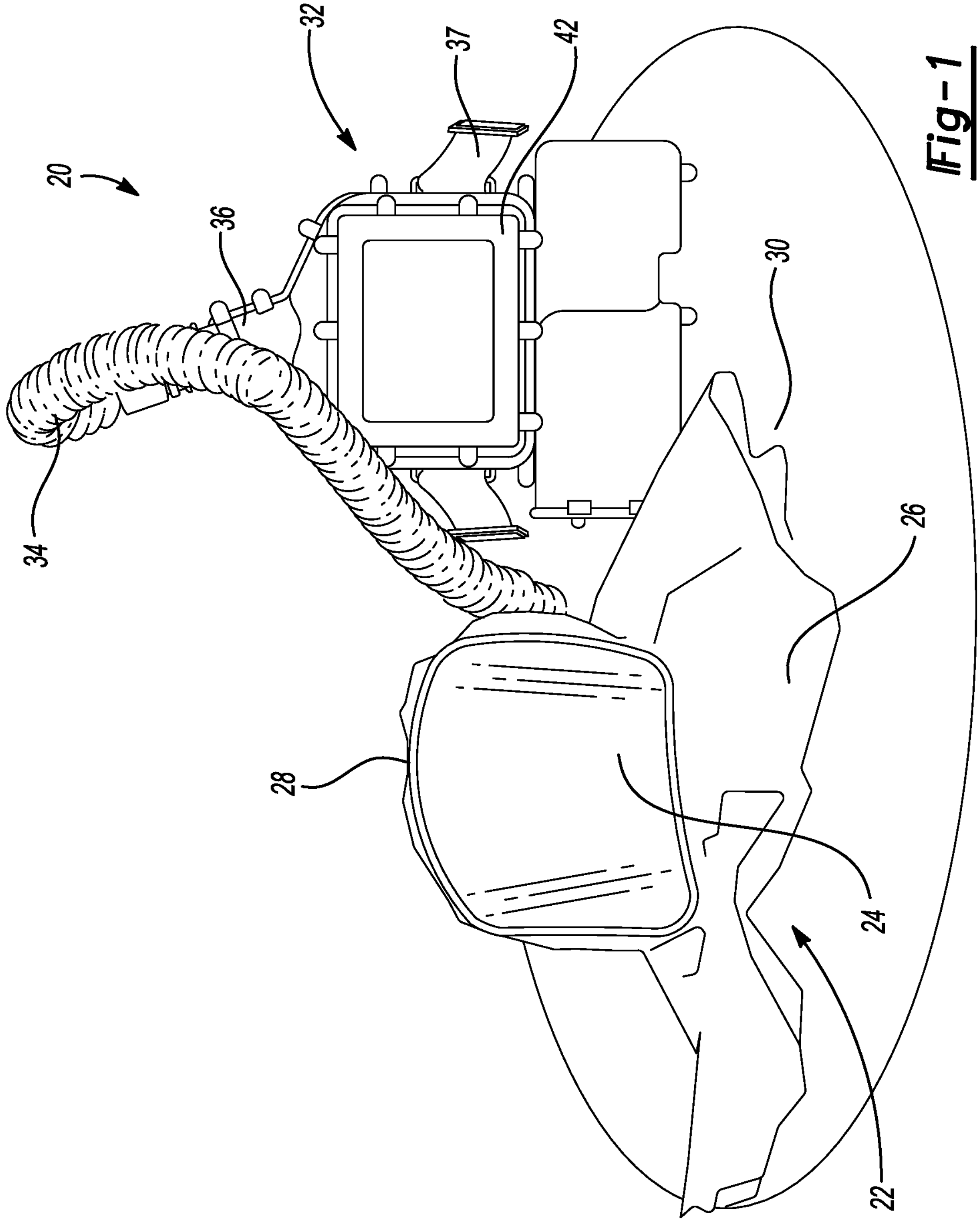
FIG. 1 is a perspective view of a personal air purifying respirator.

Referring to FIG. 1, a personal air purifying respirator 20 includes a head unit 22 to be worn over a user's head and face. The head unit 22 includes a face shield 24, such as clear glass or plastic, and a hood 26. The hood 26 includes an upper portion 28 that is received over the head and a skirt portion 30 that depends downwardly and is received over the shoulders. The head unit 22 is designed to provide a sealed environment around the users face to prevent contaminants from entering therein. The hood 26 includes an air inlet port (not visible) that receives purified air from the purifying unit 32. For example, a flexible hose 34 connects the outlet manifold 36 of the purifying unit 32 to the inlet port of the hood 26. The purifying unit 32 may the designed to be worn on a users back and may include a belt 37 for securing the unit 32 to the user.

Figure 2:
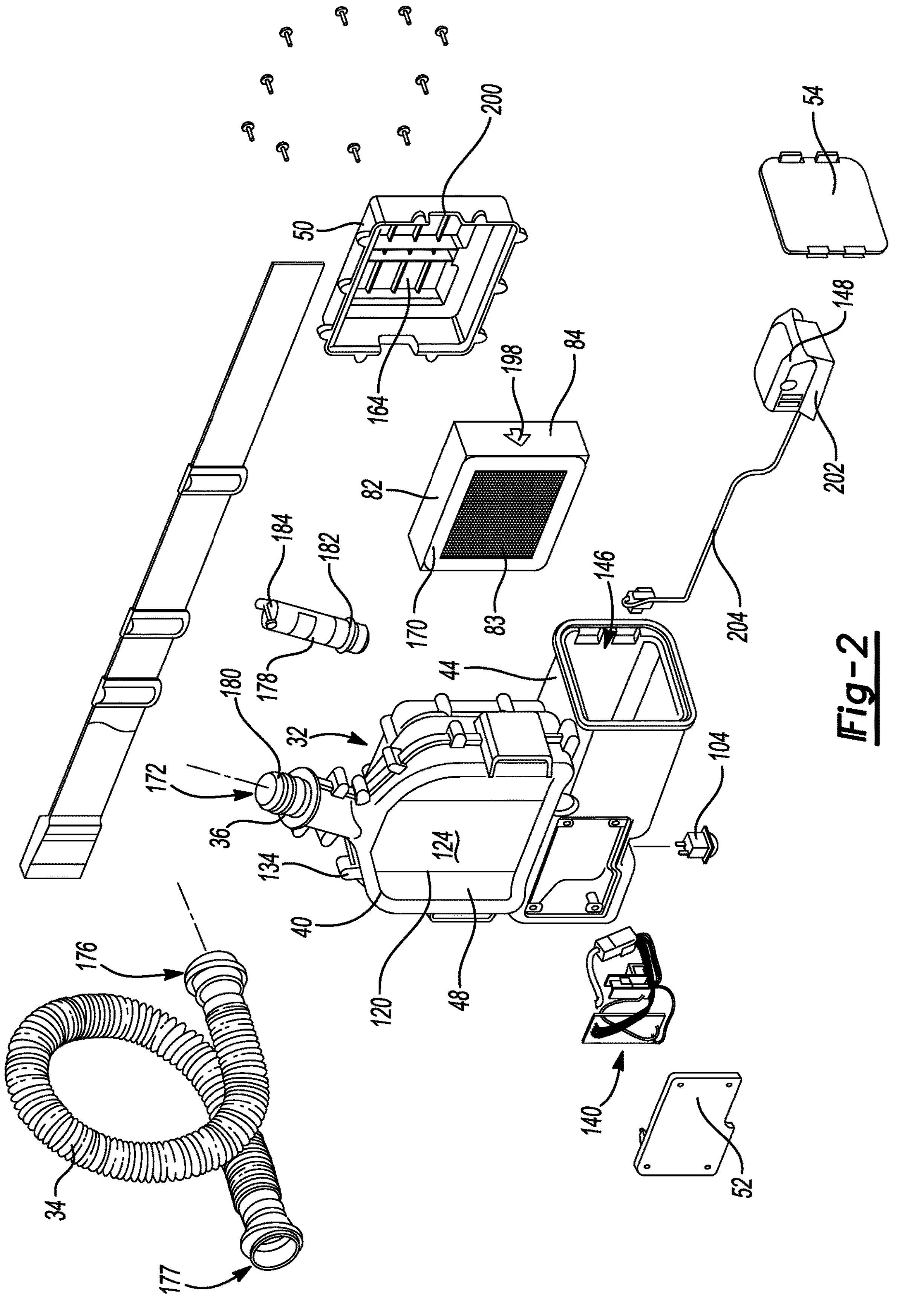
FIG. 2 is an exploded view of the respirator.
Figure 3:
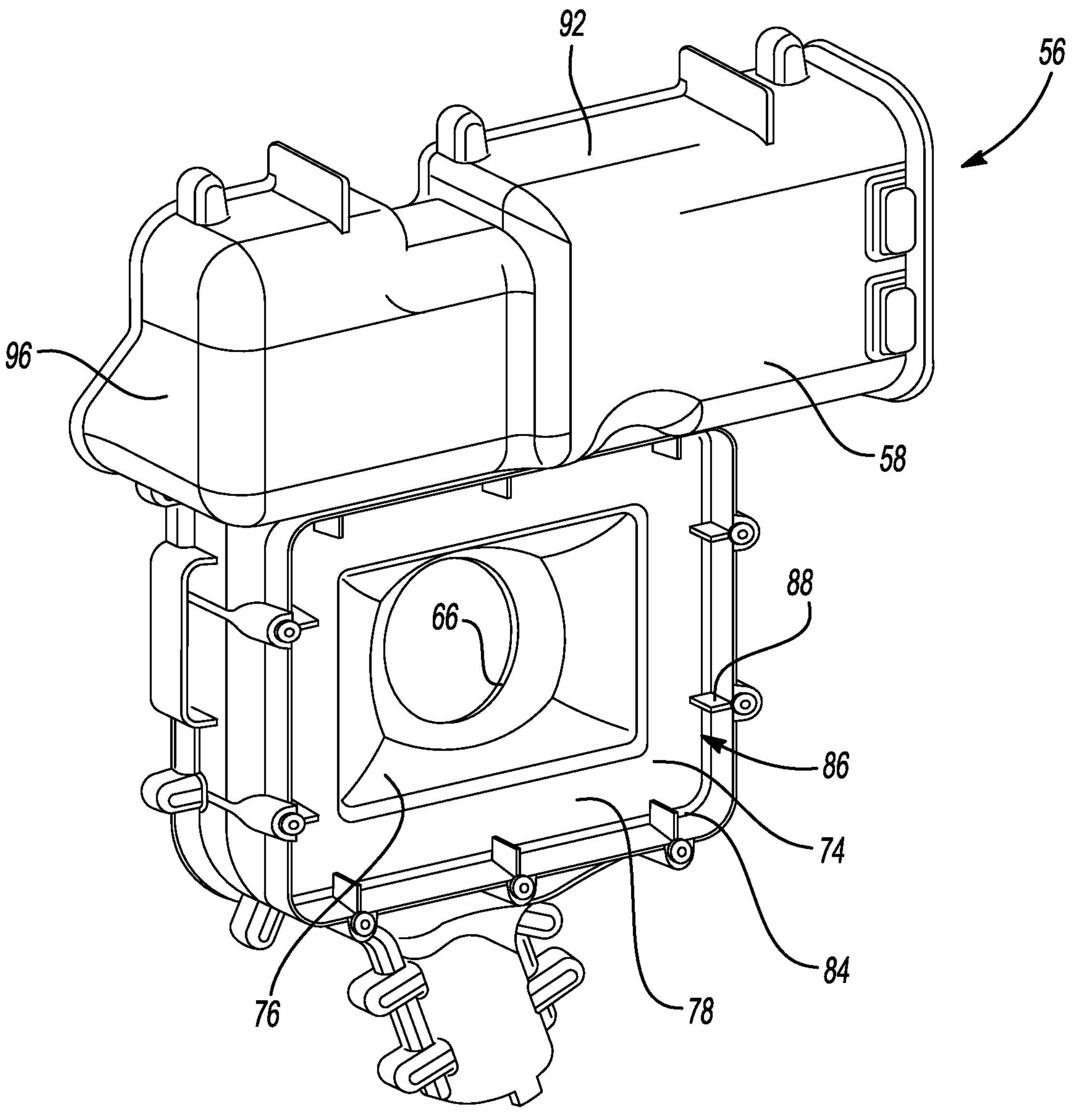
FIG. 3 is a perspective view of an exterior side of a back housing portion.
Figure 4:
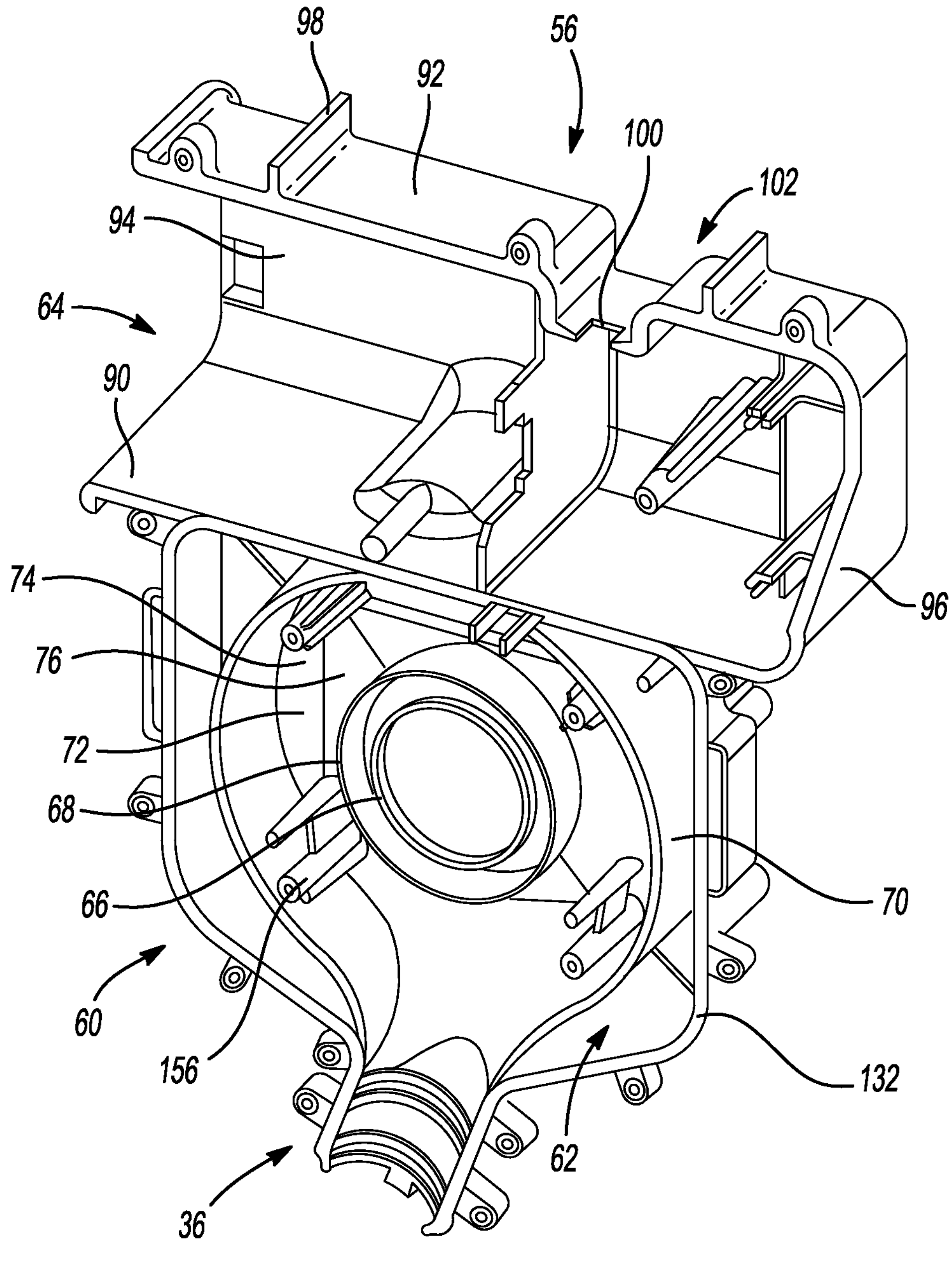
FIG. 4 is a perspective view of an interior side of the back housing portion.

Referring to FIGS. 2, 3 and 4, the purifying unit 32 may generally include a blower portion 40, a filter portion 42, and an electronics-and-battery portion 44. The purifying unit 32 includes a housing 48, a filter cover 50, an electronics cover 52, and a battery cover 54. The housing 48 and covers may be formed of injection-molded plastic components. In the illustrated embodiment, six injection molded plastic components are used. The housing 48 may be formed of two plastic-injection molded components (halves) that are secured together, e.g., a clamshell design. Use of the term "housing halves" does not necessarily mean that each half forms exactly half of the housing. The housing 48 may include a back housing portion (or half) 56 including an external side 58 and an internal side 60. The back housing portion 56 includes a blower cavity 62 and a battery-and-electronics cavity 64. The blower cavity 62 includes a pair of concentric circular supports or walls 66 and 68. The outer support wall 68 forms a support for the blower (not shown) and the inner guide wall 66 defines the air inlet to the blower portion 40. Another guide wall 70 surrounds the blower and generally defines the blower cavity 62. During operation of the blower, air is drawn in through the inlet 66 and forced radially outward into the guide wall 70. The guide wall 70 is configured to direct the pressurized air to the outlet manifold 36.

The walls 66, 68, and 70 extend from a wall 72. The wall 72 includes an outer border 74 that is generally planar and an inner portion 76 that tapers inwardly. The inner portion 76 may be generally pyramidal in shape. A front side 78 of outer border 74 forms a sealing land for the filter 82. An outer filter wall 84, which may be rectangular and have four sides, extends perpendicularly from the front side 78 and cooperates with the wall 72 to define a portion of the filter cavity 86. A plurality of alignment tabs 88 are formed on the filter wall 84 and the front side 78. The tabs 88 cooperate to center and align the filter 82 within the filter cavity 86. The tabs 88 are configured to engage with a frame 84 of the filter 82. The tabs 88 may be slender rectangles, as shown, or any other suitable shape.

The back housing portion 56 may also define a portion, e.g., roughly half, of the battery-and-electronics chamber 65. For example, the back housing portion 56 may include opposing walls 90 and 92, a wall 94 connecting between the walls 90 and 92, and an end wall 96. The wall 92 includes one or more feet 98 that support the unit 32 when not in use. The wall 92 also defines a notch 100 for the ON/OFF switch 104. The notch 100 is disposed on a recessed portion 102 of the wall 92. The recessed portion 102 reduces the likelihood of the switch 104 being inadvertently actuated and protects the switch from being damaged.

Figure 5:
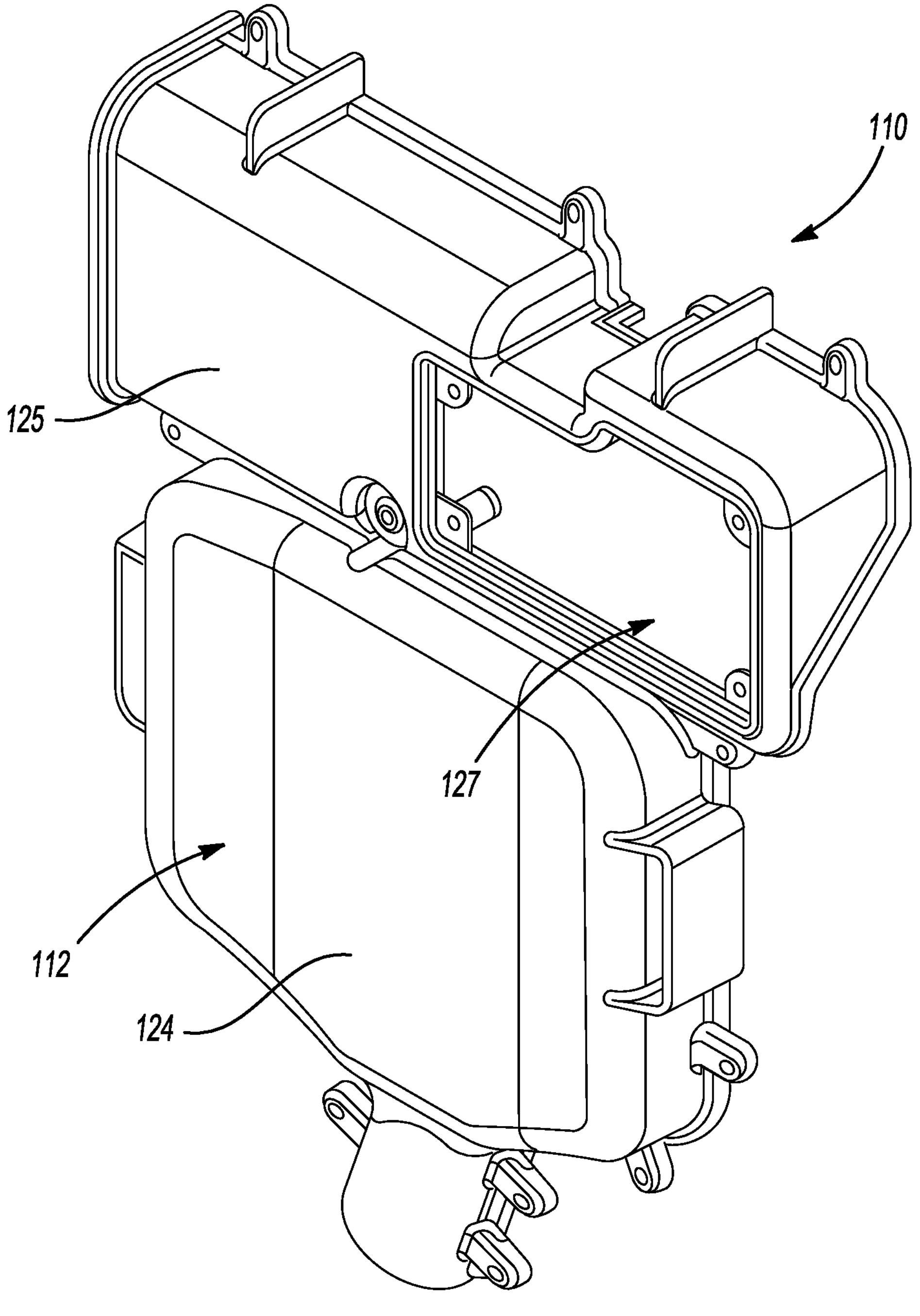
FIG. 5 is a perspective view of an exterior side of a front housing portion.
Figure 6:
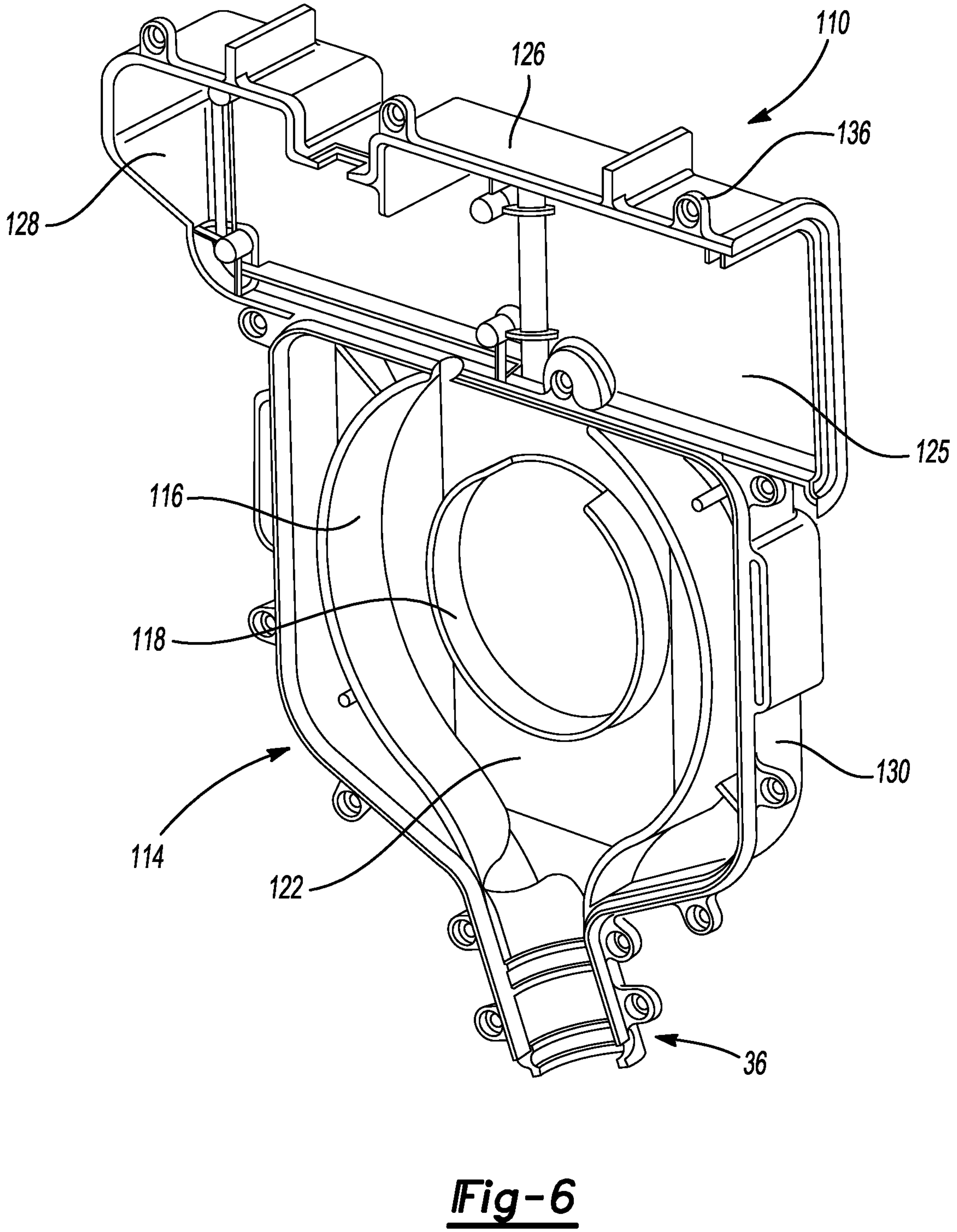
FIG. 6 is a perspective view of an interior side of the front housing portion.

Referring to FIGS. 2, 5 and 6, a front housing portion (or half) 110 may roughly define the other half of the housing 48. The front housing portion 110 includes an external side 112 and an internal side 114. The internal side 114 defines another blower cavity 115 and includes a second guide wall 116 that is sized and shaped to align with the guide wall 70 when the front and back housing portion are joined. When the front and back housing portions come together, the blower cavities 62 and 115 align and cooperate to form the blower chamber 117. The guide walls 70 and 116 cooperate to define some walls of the blower chamber 117 and guide the flow of air through to outlet manifold 36. The front housing portion 110 also includes an inner circular wall 118 that is configured to route air around the blower assembly. The walls 116 and 118 extend from an interior side 122 of a front wall 120. An exterior side 124 of the front wall 120 is configured to rest against the back of the user when in use.

The front housing portion 110 includes another portion that cooperates with the back housing portion 56 to define the battery-and-electronics chamber 64. Like the back portion, the front portion 110 also defines a battery-and-electronics cavity 106 designed to come together with the cavity 64 of the back portion 56. For example, the front cover 110 may define, at least partially, three walls of the cavity 106. The front cover may include a wall 126 that joins to the wall 92 to generally form a bottom of the unit 32, a wall 128 that joins with the wall 96 to form a closed end of the electronics-and-battery portion 44, and a wall 124 that is opposite the wall 94. The wall 125 defines an opening 127 for the electronics 140. A cover 52 is configured to seal the opening. The cover 52 may be secured to the wall 125 by a plurality of fasteners, clips, snaps, hinges, or the like.

The outer wall 130 is sized and shaped to align and connect with the outer wall 132 of the back housing portion 56. The edges of the walls 130, 132 may cooperate to define a cavity for receiving a seal (not shown) to create an airtight seal between the front and back covers 110, 56. The seal may be a gasket or may be an adhesive or bonding material. The front and back portions 56, 110 are secured to each other by a plurality of fasteners 134 that are received through one or more tabs 136 formed on the front and back covers.

The electronics-and-battery portion 44 has an open end 146 that allows access to a rechargeable battery that is removable from the unit 36. The battery cover 54 is connectable to the opened end 46 to close the electronics-and-battery chamber. The cover 54 may be secured by a plurality of fasteners, clips, snaps, hinges, or the like.

Figure 7:
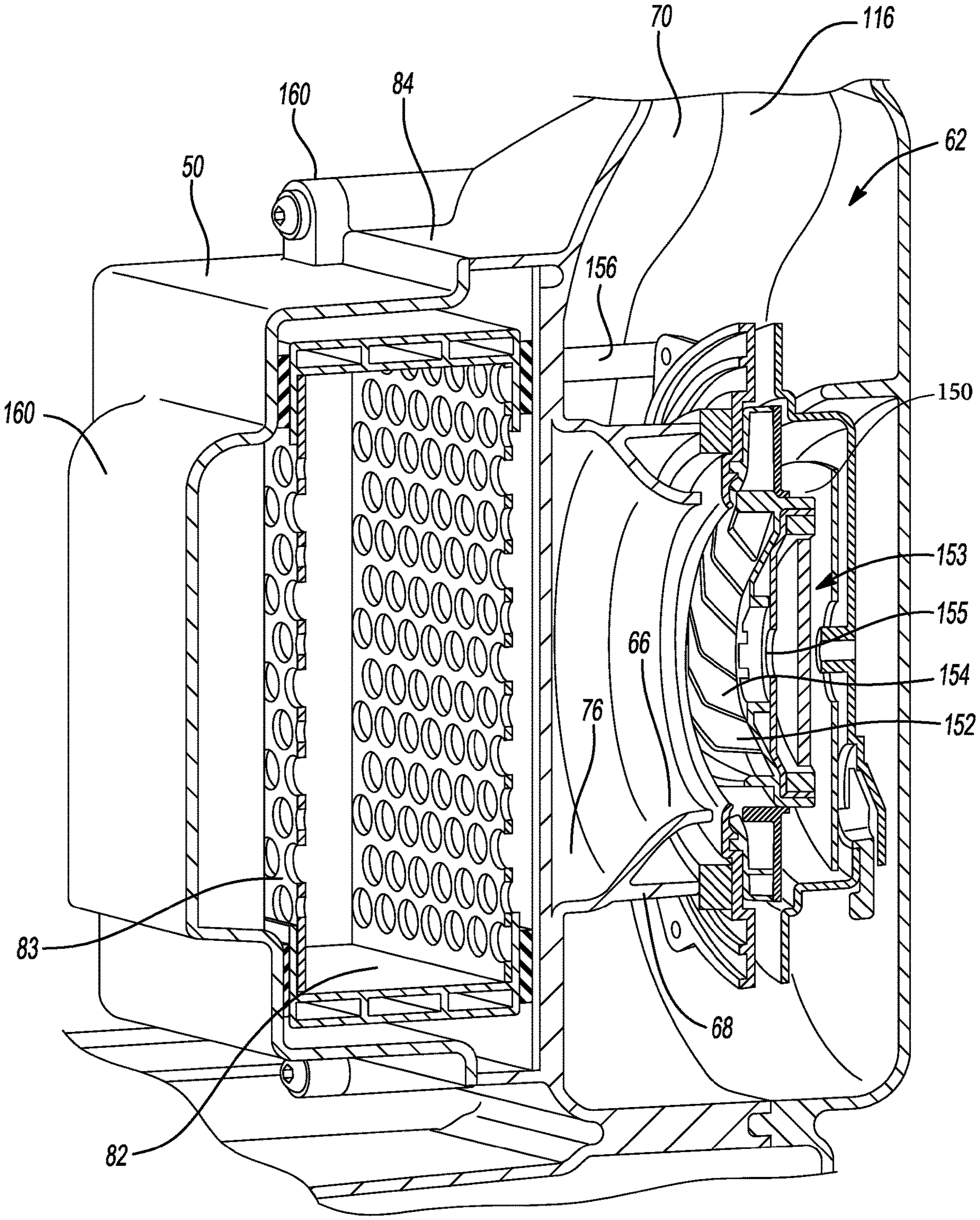
FIG. 7 is a side view, in cross section, an air purifying unit of the respirator.

Referring to FIGS. 2 and 7, a blower 150 is disposed in the blower chamber 117. The blower 150 includes a fan 152 operably coupled to a motor assembly 154. The blower 150 may be supported in the chamber 117 by a plurality of mounting posts 156 that are part of the back housing portion 56 and extend from the wall 72. The fan 152 may be an axial fan that draws air into the center of the fan 152 and expels air radially outward with a series of vanes (or blades) 154.

A motor assembly 153 includes a frame that supports the electric motor. The electric motor 155 may include a stationary stator and a rotor that is mounted for rotation within the stator. A spindle of the motor assembly is rotationally fixed to the rotor. The fan 154 is mounted to the spindle to operably coupled the fan to the motor 155. When the motor is energized, the fan 154 is rotated to provide a flow of air to the head unit 22. The blower 150 may be a high-efficiency blower that enables the battery 148 to operate for an extended period of time, e.g., 12 hours, without requiring recharging or battery change out.

The filter 82 is disposed upstream of the blower 154 within the filter cavity 86 of the housing. A filter cover 50 is connected to the housing to form the filter chamber 87. The filter chamber 87 is defined by the cooperation of the back housing portion 56 and the filter cover 50. The filter cover 50 includes walls 160 that engage with the walls 84 of the back portion 56. A gasket, adhesive or other sealing means may be placed between the edges of the walls 84 and 160 to provide an airtight seal. The cover 50 includes a face 162 that connects between the walls 160. The cover face 162 defines a plurality of air inlets 164, e.g., slots, slits, holes, etc., that allow raw air into the filter chamber 87.

The filter 82 is received within the filter chamber 87 with a gasket 170, which is supported on the frame 84, disposed against the sealing surface of the border 74. The gasket 170 is configured to create an airtight seal to prevent contaminated air from entering into the blower chamber. The filter 82 is also received within the filter chamber 86 with the frame 84 disposed against the tabs 88 to provide proper alignment.

During operation, the blower 150 draws raw air into the filter chamber 87 through the air inlets 164. The air then passes through a filter medium 83 of the filter 82, which removes contaminants such as viruses, pathogens, bacteria, molds, dirt, chemicals, and other unwanted substances. The filter 82 may be a high-efficiency particulate air (HEPA) filter. Cleaned air emerges from the clean side of the filter 82 and is guided to the blower chamber 117 by the tapered walls 76 and the guide wall 66. The guide wall 66 conveys the air from the filter 82 to the center of the fan 154 (suction side). The rotating vanes 154 force the air radially outward and through the outlet manifold 36.

The outlet manifold 36 defines an outlet port 172, e.g., a circular hole defined by the cooperation of the front and back housing portions 56 and 110. The outlet manifold 36 is configured to connect to the inlet fitting 176 of the hose 34 either directly or via an adapter 178. The other fitting 177 of the hose is configured to connect with the port on the head unit 22. In order to create an airtight seal, the hose fitting 176 must match the outlet manifold 36 or the adapter. Without the adapter, the cooperating fitting 180 of the outlet manifold 36 must be specifically designed for use with the fitting 176 of the hose. Since this fitting 180 is injection molded with the remainder of the housing 40, a redesign of the housing 40 would be required if a different type of hose fitting was used. To avoid this, the adapter 178 may be provided. The adapter 178 includes a first fitting end 182 that matches the fitting 180 of the outlet manifold 36. The other end of the adapter 184 is designed to interface with the hose fitting 176. Therefore, all that needs to be redesigned is a new adapter 178 should different hoses be used.

Figure 8:
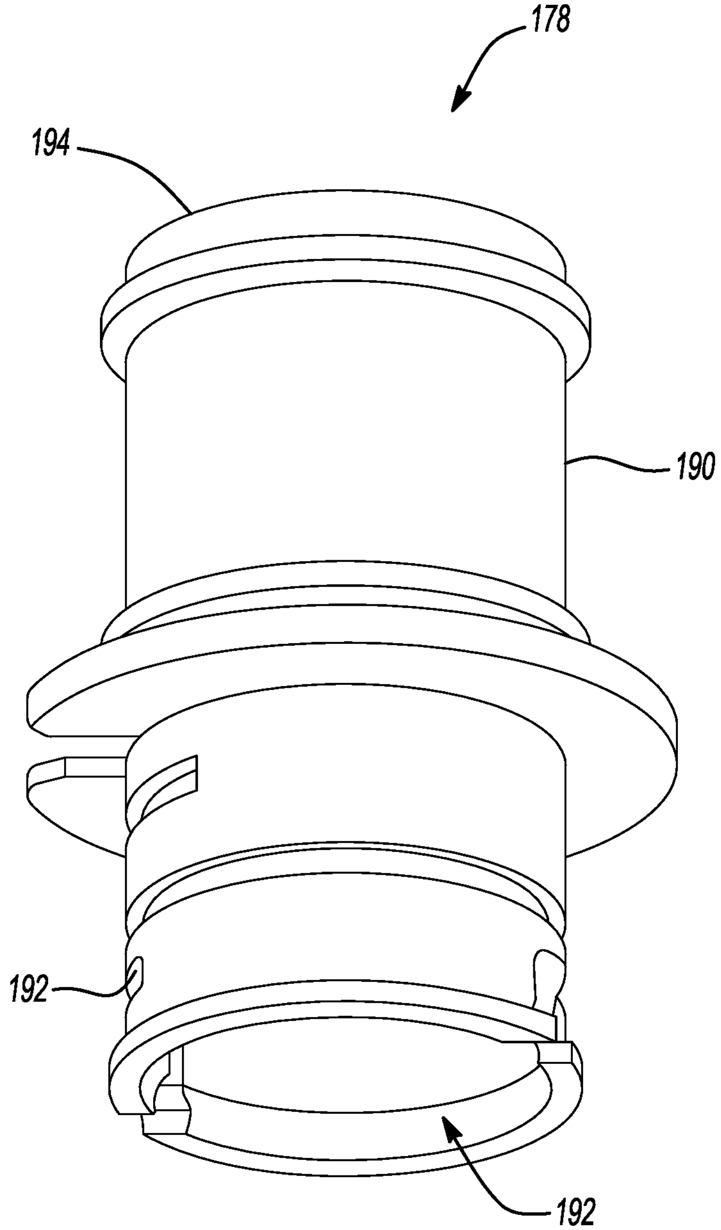
FIG. 8 is a perspective view of an air outlet adapter for hose connection.

FIG. 8 illustrates one example embodiment of the adapter 178. The adapter 178 may include a cylindrical body 190 defining a hollow center 192 that allows air to pass therethrough. The adapter 178 includes an inlet side 190 that is designed to be connected to the fitting 180 of the housing 40. The outlet side 194 includes a fitting designed to be connected to a desired hose fitting, such as fitting 176.

Referring back to FIG. 2, performance of the respirator 20 is highly dependent on the proper assembly and placement of the filter 82. The filter 82 may be directional, and to function appropriately, the filter must be installed in the device in the correct orientation. The filter 82 may include an arrow 198, or other indicia, the indicates the correct orientation of the filter 82 within the filter chamber. To allow for easy checking of filter orientation, the cover 50 may define a notch, cut out, window 200 that provides viewing of the arrow 198 so that a fully assembled product can easily be inspected.

The blower is controlled by a circuit 140 that includes a controller or micro-processor configured to at least operate the blower.

The ON/OFF switch 104 is electrically connected to the circuitry 140. Pressing the switch 104 ON causes the circuitry 142 activate the blower 150 and begin operation of the respirator 20. Similarly, pressing the switch 104 OFF ceases operation of the blower. The switch 104 may be a toggle switch for example having an ON position in an OFF position. Alternatively, the switch 104 may be a pushbutton which cycles between ON and OFF each time it is pressed. A course other types of ON-OFF switches are known and may be used.

Control circuit 140 is powered by battery 148. The battery 148 is configured to be removably connected to the unit 32. The battery 148 may be a lithium-ion battery or other suitable chemistry. The battery 148 is a rechargeable battery that may be removed from the unit and plugged into a charging station (not shown) to recharge the battery. This allows the respirator 20 to be continuously utilized whenever a charged battery is available. For example, the respirator 20 may be provided with two or more batteries allowing one of the batteries to be charged while the other batteries used so that at any given time, a functionally charged battery is available. The battery may also be chargeable within the unit.

A battery dock 202 may be provided within the electronics-and-battery portion 44. The battery dock 202 includes terminals configured to connect to terminals of the battery 148. The battery dock 202 may be connected to the circuit 140 by one or more wires 204. The battery dock 202 may include retention features that cooperate with retention features on the outer housing of the battery 148 to provide a secure connection therebetween. These retention features may include release mechanisms allowing the battery 148 to be disconnected from the dock 202. The cover 54 is removable, or otherwise openable, to allow access to the battery 148 through the open end.

The proposed respirator 20 is designed to simplify manufacturing steps and take advantage of quickly adaptable tooling in order to produce a large amount of the respirators 20 within a very short time. This is particularly helpful during an emergency, such as a pandemic, in which respirators become in short supply due to limitations of the traditional manufacturers and additional parties are recruited to fill this shortage. For example, the respirator 20 takes advantage of injection-molded components that are easily ramped up with minimal tooling time and costs. Injection-molded components of the housing and the like of the respirator 20 are also easily assembled together through simple tools and fasteners. This allows the respirator 20 to be manufactured on an emergency basis by parties that are not traditional players in the segment.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A respirator comprising:

a head unit configured to be received on a human head; and a purifying unit configured to provide purified air to the head unit, the purifying unit comprising:

a first housing portion having:

an exterior side defining a partial filter chamber with a filter sealing surface, the exterior side including a tapered wall extending from the filter sealing surface to an inlet hole that is recessed from the filter sealing surface, wherein an outer filter wall extends from a periphery of the filter sealing surface, and filter-alignment tabs extending inwardly from the outer filter wall, and an interior side including an inner circular guide wall co-axial with the inlet, a circular blower-support wall circumscribing the inner guide wall, and an outer circular guide wall circumscribing the blower-support wall and defining a blower cavity, wherein the inner guide wall, the blower-support wall, and the outer guide wall are concentric with each other, the interior side further comprises a plurality of support posts located between the outer guide wall and the blower support wall, a second housing portion having an interior side including an inner circular wall and an outer circular wall that circumscribes the inner circular wall and that defines a blower cavity, wherein the first and second housings are attached to each other to form a housing such that the blower cavities are opposite each other to define a blower chamber within the housing, a blower disposed in the blower chamber and attached to the mounting posts, and a filter having an outer wall supporting a filter medium, the filter being received in the partial filter chamber with the outer wall disposed against the sealing surface and the alignment tabs and with the filter medium covering over the tapered wall and the inlet hole such that air entering the inlet hole passes through the filter.

2. The respirator of claim 1, wherein the purifying unit further includes a filter cover connected to the exterior side of the first housing portion and cooperating therewith to enclose the filter.

3. The respirator of claim 2, wherein the filter includes an alignment indicia and the cover defines a viewing window to permit observation of the indicia.

4. The respirator of claim 1, wherein the first and second housing portions are formed of injection-molded plastic.

5. The respirator of claim 1, wherein the inner circular guide wall, the circular blower-support wall, and the outer circular guide wall are integrally formed with each other.

6. The respirator of claim 1, wherein the support posts extend in a same direction as the blower-support wall.

7. The respirator of claim 1, wherein the blower includes an axial fan operably coupled to an electric motor.

8. The respirator of claim 1, wherein the first and second housing portions cooperate to define another chamber, and wherein the purifying unit further includes a removable and rechargeable battery disposed in the another chamber.

9. The respirator of claim 8, wherein the purifying unit further includes a battery dock disposed in the another chamber and configured to connect with the battery.

10. The respirator of claim 8, wherein the housing includes a wall that forms a boundary of the another chamber, the wall defining a recessed area and an opening, wherein the purifying unit further includes an ON/OFF switch received in the opening and partially disposed in the another chamber.

11. The respirator of claim 1, wherein the purifying unit further includes a control board having a variable-speed switch.

12. The respirator of claim 1 further comprising a hose connected between the purifying unit and the head unit.

13. A purifying unit of a respirator comprising:

a first housing portion having:

an exterior side defining a partial filter chamber with a filter sealing surface, the exterior side including a tapered wall extending from the filter sealing surface to an inlet hole that is recessed from the filter sealing surface, wherein an outer filter wall extends from a periphery of the filter sealing surface, and filter-alignment tabs extending inwardly from the outer filter wall, and an interior side including an inner circular guide wall co-axial with the inlet, a circular blower-support wall circumscribing the inner guide wall, and an outer circular guide wall circumscribing the blower-support wall and defining a blower cavity, wherein the inner guide wall, the blower-support wall, and the outer guide wall are concentric with each other, the interior side further comprises a plurality of support posts located between the outer guide wall and the blower support wall;

a second housing portion having an interior side including an inner circular wall and an outer circular wall that circumscribes the inner circular wall and that defines a blower cavity, wherein the first and second housings are attached to each other to form a housing such that the blower cavities are opposite each other to define a blower chamber within the housing;

a blower disposed in the blower chamber and attached to the mounting posts; and a filter having an outer wall supporting a filter medium, the filter being received in the partial filter chamber with the outer wall disposed against the sealing surface and the alignment tabs and with the filter medium covering over the tapered wall and the inlet hole such that air entering the inlet hole passes through the filter.

14. The purifying unit of claim 13, wherein the purifying unit further includes a filter cover connected to the exterior side of the first housing portion and cooperating therewith to enclose the filter, wherein the filter includes an alignment indicia and the cover defines a viewing window to permit observation of the indicia.

15. The purifying unit of claim 13, wherein the blower includes an axial fan operably coupled to an electric motor.

16. The purifying unit of claim 13, wherein the first and second housing portions cooperate to define another chamber, and further comprising a removable and rechargeable battery disposed in the another chamber.

17. The purifying unit of claim 13, wherein the purifying unit further includes a control board having a variable-speed switch.

* * * * *